June 10, 1958  H. M. CARPENTER  2,838,101
TOOL TO RENDER A TUBELESS TIRE INFLATABLE
Filed Sept. 12, 1955  3 Sheets-Sheet 1
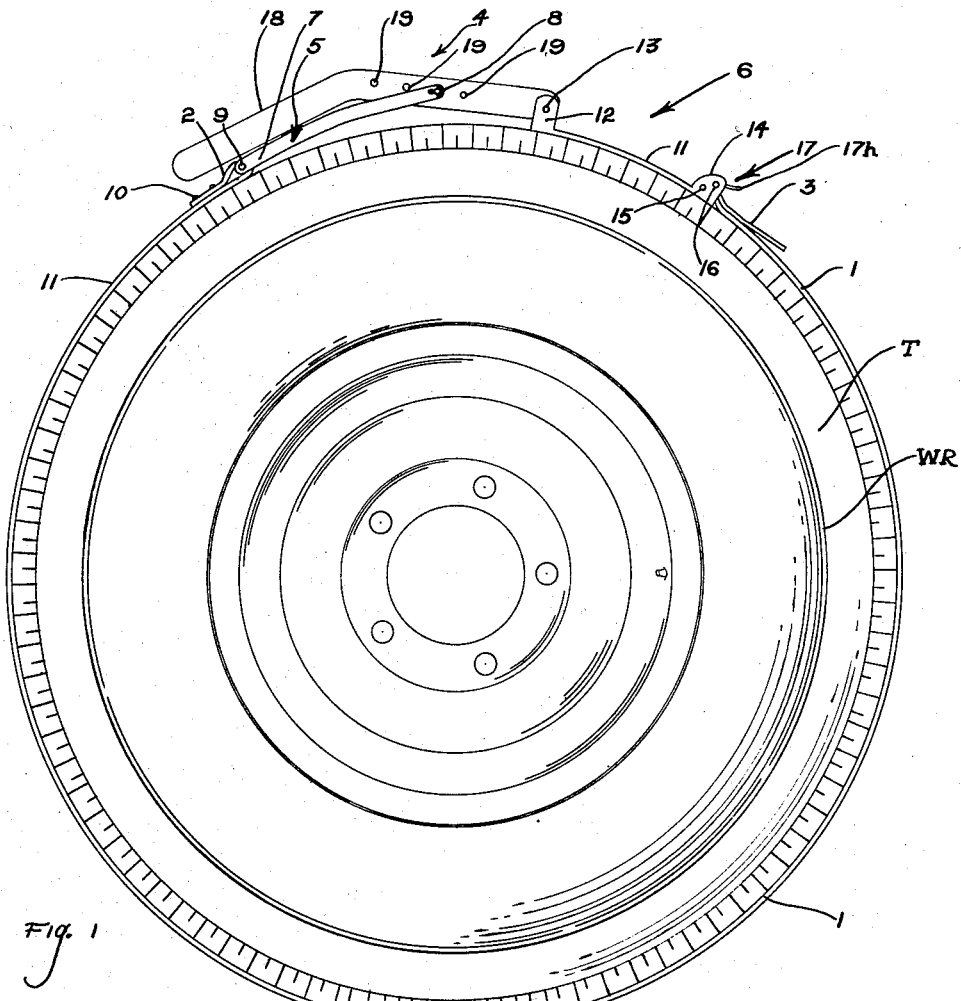
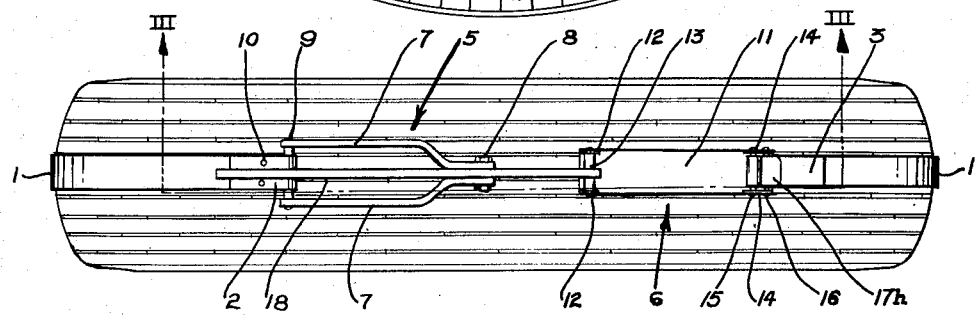
INVENTOR.
HARLEY M. CARPENTER
BY R. W. Hodgson

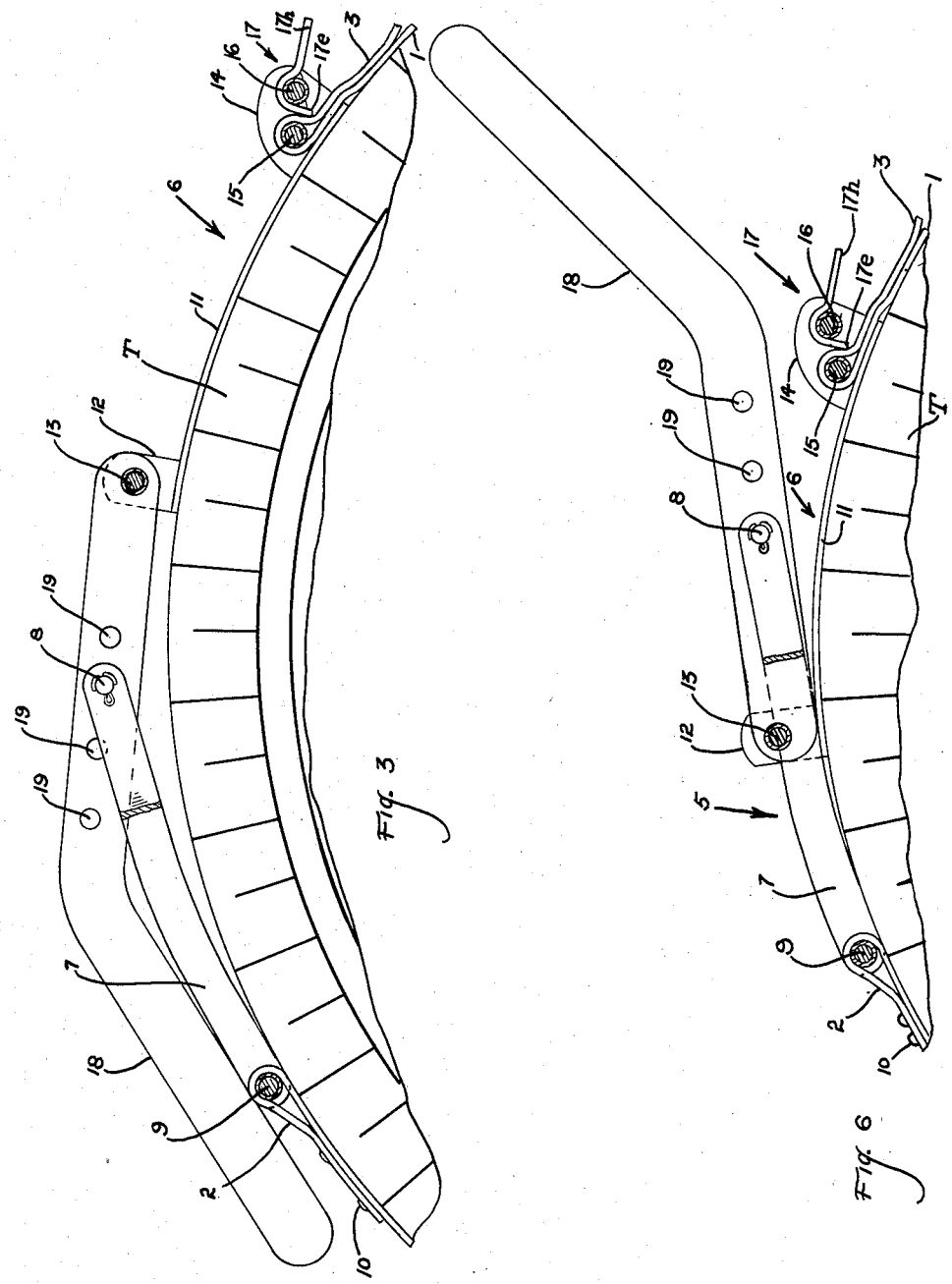

June 10, 1958 H. M. CARPENTER 2,838,101
TOOL TO RENDER A TUBELESS TIRE INFLATABLE
Filed Sept. 12, 1955 3 Sheets-Sheet 3

INVENTOR.
HARLEY M. CARPENTER
BY R. W. Hodgson

2,838,101

TOOL TO RENDER A TUBELESS TIRE INFLATABLE

Harley M. Carpenter, Bellflower, Calif.

Application September 12, 1955, Serial No. 533,730

1 Claim. (Cl. 157—1.21)

Generally speaking, the present invention relates to tubeless tires, such as the tubeless tires recently developed for motor vehicles, for example. More particularly, the present invention relates to a novel tool for effectively sealing the beads of a tubeless tire with respect to the inside of a wheel rim whereby to render said tubeless tire inflatable.

A serious disadvantage of a tubeless tire of the type having inner laterally spaced circular beads normally adapted to sealingly engage the inside of a wheel rim when such a tubeless tire is fully inflated, is the problem that arises when the tire becomes deflated either as a result of direct damage thereto, and the consequent escape of the pressurized air from the interior thereof, or as a result of the deflation and/or removal of the tire with respect to the wheel rim for the purpose of repairing the tire, changing it or the like. It will be found that when such a deflated tubeless tire is in encircling relationship with respect to a wheel rim and is to be inflated, the inflation operation presents quite a problem because it is difficult to cause the relatively loose inner beads of the tubeless tire to become sealingly engaged with corresponding portions of the inside of the wheel rim to a degree such as to be capable of holding pressurized air. Incidentally, for purposes of clarification, it should be noted that when such a tubeless tire is fully inflated the pressurized air within the tubeless tire forces the inner beads of the tire against the inside of the wheel rim thereby effectively sealing same. However, when the interior pressurized air is removed from within the tubeless tire, it will be understood that the beads lose their effective seal with respect to the inside of a wheel rim.

Various prior art devices and techniques have been developed in the attempt to overcome this problem. However, all of them known to applicant are relatively complex, costly and/or difficult to use.

Generally speaking, the tool of the present invention may be defined, for illustrative purposes, as set forth hereinbelow. It may include a longitudinal tensile member (preferably, though not necessarily, taking the form of a substantially flat, thin-sheet, fabric, longitudinal tensile belt member) cooperable to be placed in encircling peripheral contact with the exterior of a tubeless tire (in the preferred form, wherein said tensile member comprises a flat, thin-sheet, fabric, longitudinal tensile belt member, this may comprise being placed with one flat surface thereof in encircling peripheral contact with the exterior of a tubeless tire) in substantially concentric relationship with respect to said tire. The invention may also include manually operable tension-applying means having a first end (or portion) effectively connectable to (or effectively connected to) a first end of said longitudinal tensile member and having a second end (or portion) effectively connectable to (or effectively connected to) a second end of said longitudinal tensile member (usually adjustably connectable with respect to said second end of said longitudinal tensile member whereby adjustment of the entire device may be made to an overall length such as to closely encircle the exterior of a tubeless tire in peripheral contact therewith and in substantially concentric relationship with respect to the tire); said tension-applying means being manually operable into tension-applying relationship with the overall length of said tension-applying means effectively shortened by a preselected distance (which is preferably, though not necessarily, selectively adjustable) and being alternately manually operable into tension-releasing relationship with the overall length of said tension-applying means effectively lengthened by said preselected distance.

In one preferred form of the present invention, the tension-applying means may include a pivoted, over-center lever means manually operable into an over-center position, when in tension-applying relationship, thereby effectively locking the tension-applying means in said tension-applying relationship until manual release thereof.

From the above description of basic and preferred generic forms of the present invention, it will be apparent to those skilled in the art that virtually all of the hereinbefore mentioned prior art problems and/or disadvantages in re the inflation of tubeless tires are virtually completely met and overcome in and through the use of the tool of the present invention.

For example, it is obvious that the longitudinal tensile member of the tool of the present invention may be very easily placed in closely encircling peripheral contact with the exterior of a tubeless tire and in substantially concentric relationship with respect to the tire, and that the overall length of the tension-applying means may be effectively shortened by an adjustable pre-selected distance correlated with the size of the tire, whereby to effectively constrict the tubeless tire and to effectively cause the beads of said tubeless tire to sealingly engage the inside of a wheel rim, thus placing the tire in condition for inflation.

Furthermore, it is obvious that the device of the present invention may be caused to perform the tire-bead-sealing operation, set forth in the preceding paragraph, with a minimum of effort and knowledge on the part of the user of the tool, thereby greatly facilitating the operation and making it possible for the average person to perform it. Indeed, the operation is so simple with the tool of the present invention, and the tool itself is of such simple, small, lightweight construction, that it becomes feasible for every motor vehicle to carry one for emergency use.

With the above points in mind, it is an object of the present invention to provide a novel, simple, cheap, small, lightweight, easy-to-operate tool for effectively sealing the beads of a tubeless tire with respect to the inside of a wheel rim whereby to make said tubeless tire inflatable.

Other and allied objects will be apparent to those skilled in the art after a careful perusal, examination and study of the accompanying illustrations, the present specification and the appended claim.

To facilitate understanding reference will be made to the hereinbelow described drawings, in which:

Fig. 1 is a reduced-size front elevational view of one illustrative embodiment of the present invention after it has been placed in closely encircling peripheral contact with the exterior of the tubeless tire and in substantially concentric relationship with respect to said tire—however, this view shows the manually operable tension-applying means before having been operated into tension-applying relationship;

Fig. 2 is a top plan view of Fig. 1;

Fig. 3 is a somewhat larger scale fragmentary view (partly in elevation and partly in vertical section) of the tool taken in the direction of the arrows III—III in Fig. 2, with the fragmentary portion of the tubeless tire being shown in elevation;

Fig. 6 is a somewhat larger scale fragmentary view (partly in elevation and partly in vertical section) similar to Fig. 3 but showing the manually operable tension-applying means in the position shown in Fig. 4 after having been operated into tension-applying relationship, effectively constricting the tire.

Figure 4:
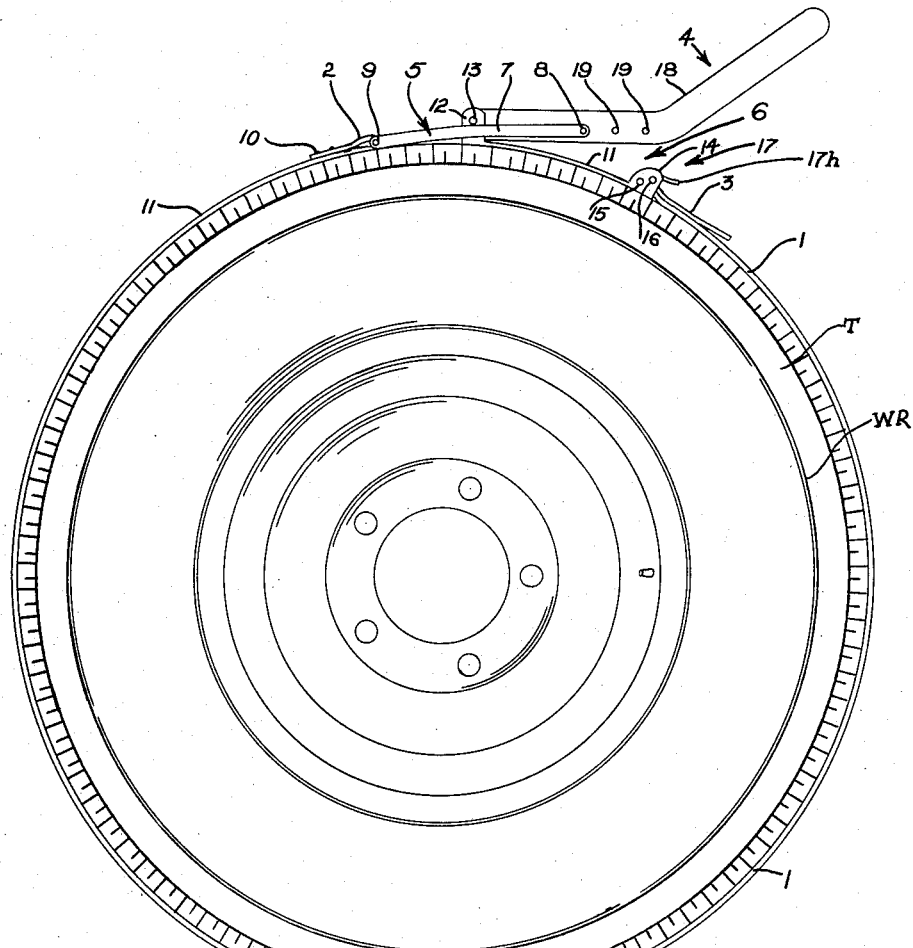
Fig. 4 is a reduced-size front elevational view similar to Fig. 1 but showing the manually operable tension-applying means after having been operated into tension-applying relationship, effectively constricting the tire.

Generally speaking, the tool of the present invention may include a longitudinal tensile member, which in the specific example illustrated, takes the form of a substantially flat, thin-sheet, fabric, longitudinal tensile belt member 1 having a first end 2 and a second end 3.

Also generally speaking, the present invention may include manually operable tension-applying means, in the specific example illustrated, indicated generally at 4, having a first end (or portion), in the specific example illustrated, indicated at 5, and having a second end (or portion), in the specific example illustrated, indicated at 6. It should be understood that said first end (or portion) 5 of said tension-applying means 4 is effectively connectable to (or connected to) said first end 2 of the belt 1, and that said second end (or portion) 6 of said tension-applying means 4 is effectively connectable to (or connected to) the second end 3 of the belt 1.

In the specific example illustrated, the above takes the form of specific structure wherein the first end (or portion) 5 of the tension-applying means 4 comprises a yoke-shaped structure having spaced arms 7 connected together at their right ends by bolt and nut means 8 and provided at their left ends with a connecting pin 9 around which the first end 2 of the belt 1 is looped and fastened by suitable fastening means, such as rivets 10 or the like. Also in this specific version, the second end (or portion) 6 of the tension-applying means 4 takes the form of a base plate 11 provided at the left end thereof with a pair of upstanding ears 12 carrying therebetween a connecting pin 13; said base plate 11 being provided at the right end thereof with a second pair of upstanding ears 14 carrying therebetween a snubbing member 15, a connecting pin 16, and eccentric means 17 rotatably mounted on pin 16.

It will be understood that the second end 3 of the belt 1 is adapted to be inserted between the ears 14, underneath the snubbing member 15, back over the top of the snubbing member 15, and underneath the rotatably mounted eccentric means 17, and to be selectively adjusted as to overall length until the belt 1 closely encircles the periphery of the tire T as shown in Fig. 1. Then the handle end 17h of the eccentric 17 is moved downwardly, thus causing the toothed or serrated engaging end 17e of the eccentric 17 to be forced against the end 3 of the belt 1 in the manner shown in Fig. 3, thus providing a means for adjusting the effective overall length of the belt 1, and which positively locks the belt 1 in the adjusted position, and which will further tend to become even more firmly engaged with the end 3 of the belt 1 as a result of tension applied to the belt 1.

Figure 5:
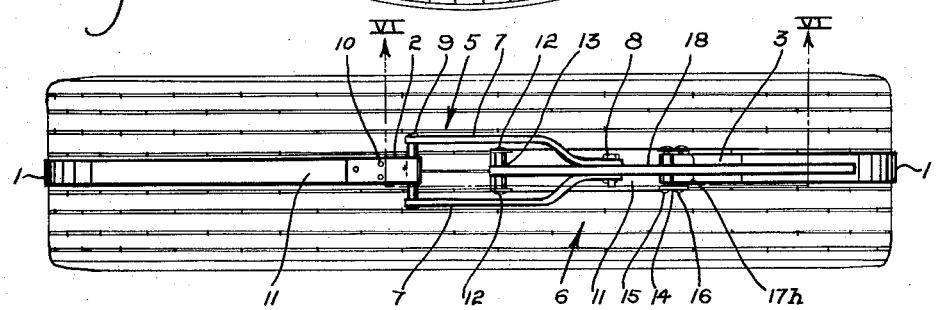
Fig. 5 is a top plan view of Fig. 4.

In the specific example illustrated, the tension-applying means 4 includes an over-center lever means 18 pivoted on the pin 13 carried by the second end (or portion) 6 of the tension-applying means 4 and connected (in a rotatable manner) to the first end (or portion) 5 of the tension-applying means 4 by means of the bolt and nut connection 8—said point of connection of 8 being remote from the point of pivotal attachment of said lever means at 13 and being selectively adjustable as to remoteness by positioning the nut and bolt means 8 with respect to any of the holes 19 in the lever 18 whereby to effectively adjust the length of the operating stroke of the device— that is, the difference between the overall length of the tension-applying means 4 as shown in Figs. 1, 2 and 3 and as shown in Figs. 4, 5 and 6. This feature makes it possible to adjust the length of said operating stroke to a desired pre-selected distance suitable to provide the proper degree of constriction for substantially any size of tubeless tire such as to effectively cause the beads of said tubeless tire to be effectively sealed within the inside of a wheel rim. Incidentally, it should be noted that a standard type wheel rim is indicated at WR, and the exact structure thereof, the exact structure of the inner beads of the tubeless tire T and the sealed engagement thereof, such as occurs in Figs. 5 and 6 are not shown in detail since these parts are well known in the art and do not comprise applicant's inventive concept.

Incidentally, it will be noted, from examination of Figs. 4 and 6, that the lever means 18 effectively comprises an over-center lever operable from the position shown in Figs. 1, 2 and 3 into the over-center, tension-applying position shown in Figs. 4, 5 and 6, thereby effectively locking the tension-applying means 4 in said tension-applying relationship until manual release thereof by manual operation of the lever 18.

The operation of the device may be briefly described as follows:

The device is first placed on the exterior of the deflated tubeless tire T (which is carried on the wheel rim WR) and the belt 1 is adjusted to take up the slack, after which the eccentric 17 is rotated in clockwise direction to effectively lock said belt in said relationship. This position is best shown in Figs. 1, 2 and 3. Then the lever 18 is grasped and is pivoted around the pin 13 in a clockwise direction into the over-center, tension-applying position shown in Figs. 4, 5 and 6, which effectively constricts the tire T thus causing the inner beads thereof to become effectively sealed with respect to the wheel rim WR, thereby placing said tubeless tire in condition for inflation.

Numerous modifications and variations of the present invention will occur to those skilled in the art after a careful study hereof. All such properly within the basic spirit, scope and/or teachings of the present invention are intended to be included and comprehended herein as fully as if specifically described, illustrated and claimed herein.

The exact compositions, configurations, constructions, relative positionings, and cooperative relationships of the various component parts of the present invention are not critical, and can be modified substantially within the spirit of the present invention.

The embodiment of the present invention specifically described and illustrated herein is exemplary only, and is not intended to limit the scope of the present invention, which is to be interpreted in the light of the prior art and the appended claims only, with due consideration for the doctrine of equivalents.

I claim:

A tool for effectively sealing the beads of a tubeless tire with respect to the inside of a wheel rim whereby to render said tubeless tire inflatable, comprising: a substantially flat, thin-sheet fabric, longitudinal tensile belt member to engage the periphery of said tire; and manually operable tension-applying means having a first portion pivotally connected at one end to one end of said belt and having a second portion removably and adjustably connected to the other end of said belt, said tension-applying means including an over-center lever means pivoted to said second portion of said tension-applying means and connected to the other end of said first portion of said tension-applying means at a point remote from the point of pivotal attachment of said lever means to said second portion, said lever means being manually pivotally operable about its point of pivotal attachment to said second portion into an extreme over-center position with respect to said point of pivotal attachment thereby moving said first and second portions of said tension-applying means closer together and locking them in tension-applying relationship until manual release thereof, said point of pivotal attachment of said over-center lever means to said second portion being radially outwardly displaced a distance substantially greater than the radial outward displacement of the point of connection of said over-center lever means to said other end of said first portion of said tension-applying means when said lever means is manually pivoted around its point of pivotal attachment with respect to said second portion into said extreme over-center position, means for selectively adjusting the distance between the connections of said lever to said first and second portions; said second portion of said tension-applying means including rotatively mounted eccentric means adjacent the removable and adjustable connection of said other end of the belt to effectively lock said other end of said belt with respect to said second portion of said tension-applying means.

References Cited in the file of this patent
UNITED STATES PATENTS

| | | |
|---|---|---|
| 588,268 | Davis | Aug. 7, 1897 |
| 1,324,927 | Robinson | Dec. 16, 1919 |
| 1,598,561 | Coomer | Aug. 31, 1926 |
| 1,966,580 | Bull | July 17, 1934 |
| 2,684,112 | Coats | July 20, 1954 |